Aug. 1, 1950     H. L. WURGAFT     2,517,519
FRUIT CENTERING MEANS FOR CITRUS JUICE EXTRACTORS

Filed July 11, 1944     3 Sheets-Sheet 1

Inventor
HARRY L. WURGAFT
By Hazard and Miller
Attorneys

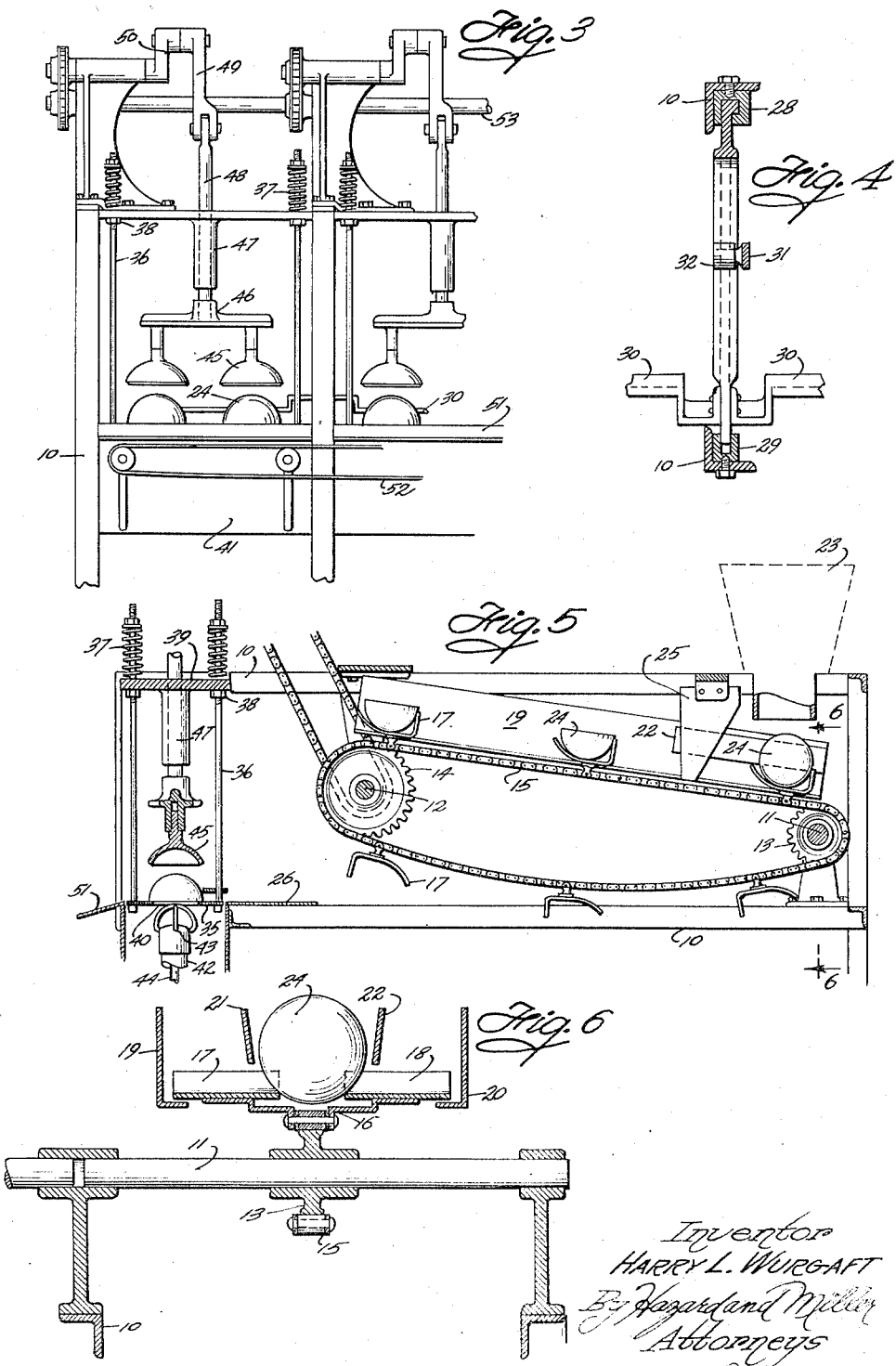

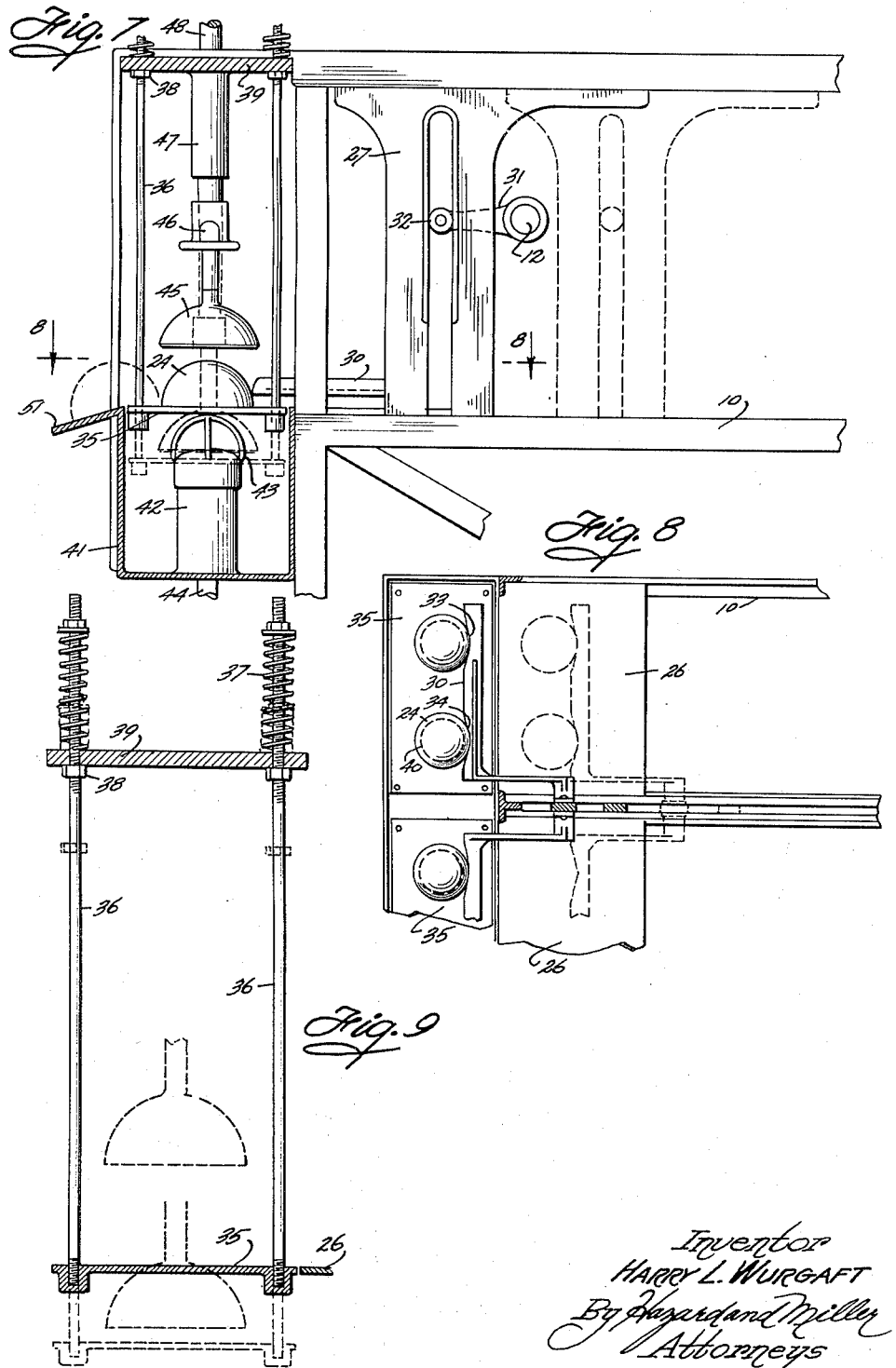

Patented Aug. 1, 1950

2,517,519

UNITED STATES PATENT OFFICE 2,517,519

FRUIT CENTERING MEANS FOR CITRUS JUICE EXTRACTORS

Harry L. Wurgaft, Fullerton, Calif., assignor to Fred S. Markham and Maziebelle G. Markham Application July 11, 1944, Serial No. 544,343

5 Claims. (Cl. 146—3)

1

This invention relates to a citrus juice extractor wherein it is proposed to feed citrus fruits such as oranges into a grader or sizer that will segregate fruits as to size, automatically cut fruit into halves and position the halves over a reamer. Thereafter the halves are pressed against the reamer in such a manner as to effect a removal of the juice without damaging or squeezing the skin or rind which contains an oil that if mixed with juice imparts a disagreeable flavor thereto. When the halves have been properly reamed the skin is removed from the reamer and deposited on a conveyor for suitable disposal. The juice removed by the reamer is caught and either bottled or canned or otherwise utilized. The improved machine is designed to perform all of the above operations automatically and another object of the invention is to provide a machine having relatively simple, sturdy and highly durable construction for carrying the above mentioned functions into effect.

More specifically an object of the invention is to provide in a citrus juice extractor, a simple and highly efficient device for cutting the fruit into halves and thereafter handling them so that they may be properly positioned on a support to enable their being automatically positioned against the reamer.

Still another object of the invention is to provide a simplified construction for pressing halves of citrus fruit against a reamer so that the fruit will be completely reamed but without causing the reamer to penetrate the skin which would cause particles of pith as well as the oil of the skin to drop into the juice extracted by the reamer.

With the foregoing and other objects in view, which will be made manifest in the following detailed description and specifically pointed out in the appended claims, reference is had to the accompanying drawings for an illustrative embodiment of the invention, wherein:

Fig. 3 is a partial view in elevation taken in the direction of the arrow 3 upon Fig. 1.

Fig. 4 is a vertical section taken substantially upon the line 4—4 upon Fig. 1.

2

Figure 2:
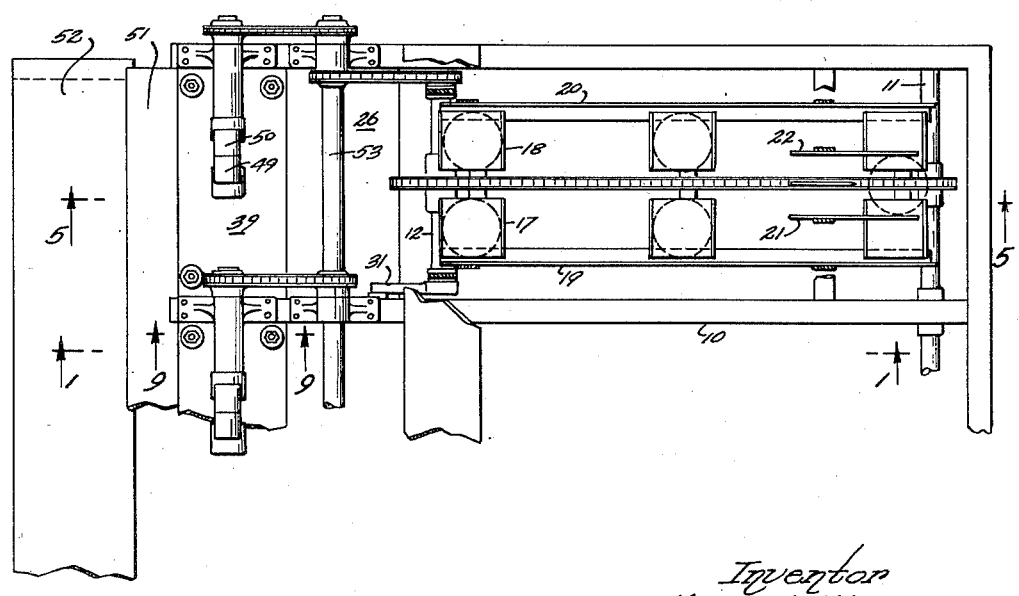
Fig. 2 is a top plan view in elevation of that unit illustrated in Fig. 1 and may be regarded as taken in the direction of the arrow 2 upon Fig. 1.

Fig. 5 is a vertical section taken substantially upon the line 5—5 upon Fig. 2.

Fig. 6 is a vertical section taken substantially upon the line 6—6 upon Fig. 5.

Figure 1:
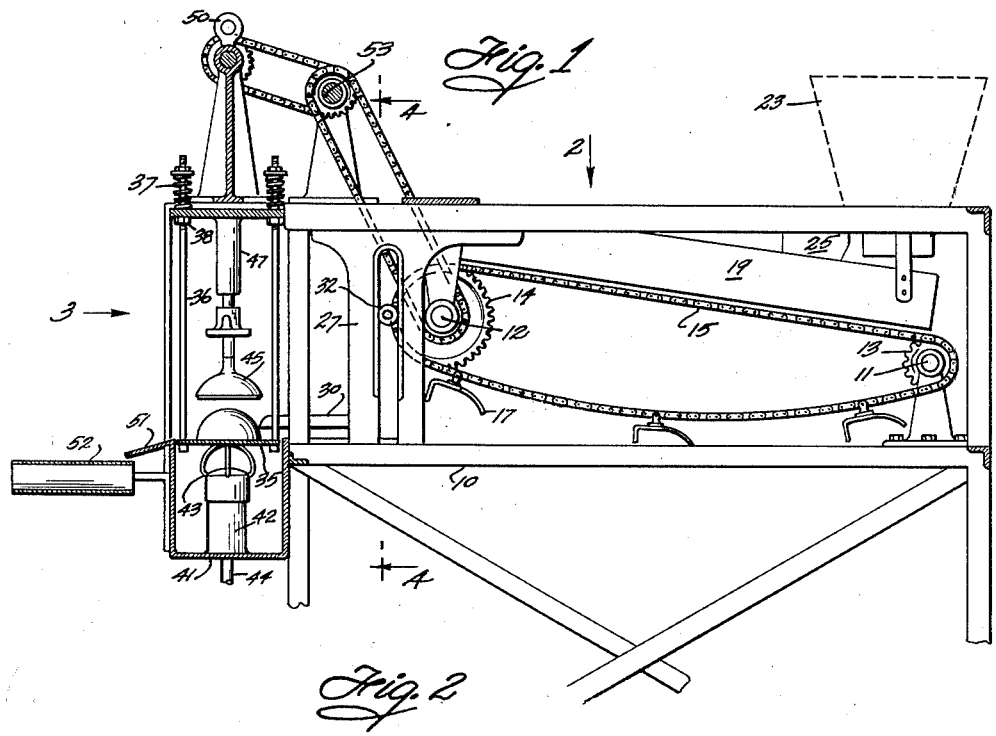
Fig. 1 is a partial view in side elevation of one unit which may form a part of the completed juice extractor embodying the present invention, parts being illustrated in vertical section. This view may be regarded as having been taken upon the line 1—1 upon Fig. 2.

Fig. 7 is a vertical view similar to Fig. 1, but illustrating a portion of the apparatus on an enlarged scale and the manner of operation.

Fig. 8 is a horizontal section taken substantially upon the line 8—8 upon Fig. 7.

Fig. 9 is a partial view illustrating the details of construction.

Referring to the accompanying drawings wherein similar reference characters designate similar parts throughout, the improved citrus juice extractor comprises a suitable frame 10 on which there are supports for the bearings for two shafts 11 and 12. On these shafts there are sprockets 13 and 14 over which there is trained an endless chain 15 carrying a series of brackets 16 (see Fig. 6) on which there are opposed cups or buckets 17 and 18. The upper reach of the endless chain 15 extends between flanged side walls 19 and 20 and near the forward side of the machine there are mounted spaced inner partitions 21 and 22.

The completed citrus juice extractor may be made up of a plurality of units, each of which may be identical with the adjoining units, except for minor variations in size. Because of the similarity of the units only a single unit will be described herein. The citrus fruit such as oranges that are to have juice extracted therefrom are first run through a grader or sizer indicated schematically at 23 which serves to segregate the fruit as to size. All of the oranges having a given size may be fed to one of the units of the complete machine and oranges of other sizes are accordingly fed to other units of the machine that are designed to handle the oranges of other sizes. On any given unit the fruit indicated at 24 is deposited from the grader or sizer 23 between the partitions 21 and 22 so as to be partially supported on the cups or buckets 17 and 18 of an adjoining pair. A knife 25 is supported from the frame of the machine so as to have the buckets 17 and 18 carried on opposite sides thereof during movement of the carrier chain 15. As the carrier chain moves rearwardly the fruit 24 carried by the buckets is pushed against the knife which preferably has a downwardly and rearwardly sloping cutting edge and is split into opposed halves. When these halves are carried between the ends of the partitions 21 and 22 they are free to fall outwardly so that on completion of the cutting operation each half is deposited in a face up condition as indicated in Fig. 5 on its respective cup or bucket 17 or 18 as the case may be. On the frame 10, rearwardly of the sprocket 14 there is provided a suitable platform 26 and as the buckets are carried about the sprocket 14 the edges of the split fruit are emptied therefrom and are deposited on the platform in a face down condition. Near one side of each unit there is provided a slotted follower 27 slidable between ways 28 and 29 which follower carries oppositely extending pusher arms 30 designed to traverse the platform 26. The shaft 12 carries a crank or eccentric 31 equipped with a roller 32 that is disposed within the slot of the follower so that as this shaft rotates the follower 27 will be reciprocated in synchronism with the emptying of the buckets or cups 17 and 18 on to the platform 26. These pusher arms preferably have at their forward sides suitable notches 33 and 34 adapted to engage the forward sides of the inverted fruit halves so as to center them with relation to the pusher arms as these halves are pushed forwardly.

At the rear end of the platform 26 there is a vertically movable apertured support indicated at 35. This apertured support is suspended at its corners by rods 36 that are in turn supported on the frame 10 by means of compression springs 37. Adjustable nuts 38 are threaded on to the rods and are engageable with the underside of the plate 39 on the frame 10 to limit upward movements of the rods 36 to a position wherein the plate or apertured support 35 is flush with the platform 26. As the rods 36 are slidable through the plate 39 it is of course, possible to force the plate 35 downwardly as indicated by the dotted lines on Fig. 7. The plate 35 has apertures 40 formed therein which are of a size equal to the size of the fruit for which the particular unit is designed, minus the thickness of the skin or rind. Consequently when the halves of the fruit are engaged by the pusher arms 30 and are moved forwardly on to the plate 35, these halves will assume a position as shown in Fig. 8 wherein the pulp portion of the fruit overlies the apertures and the halves will be supported by the edge of the skin.

Below the plates 35 of the various units there is a trough 41 designed to receive the juice that is extracted. In this trough there are mounted standards 42 for reamers 43 that are rotated about a vertical axis such as by shafts 44. One reamer is disposed beneath each of the apertures in the plate 35. Above each aperture there is disposed a cap or cup 45. These caps may be mounted on a suitable cross head 46 that is vertically reciprocal through a suitable bearing 47 on the plate 39. The stem of the cross head indicated at 48 is vertically reciprocated by a link 49 connecting it to a crank 50. On rotation of this crank 50 the cups or caps 45 which are designed to closely fit the halves of the fruit will be caused to descend and engage the fruit halves and press them together with the plate 35 downwardly so that the exposed pulp portions that are exposed by the apertures 40 may engage the reamers. On upward movements of the caps 45 the plate 35 returns to its normal position wherein it is flush with platform 26 and the caps are elevated thereabove as shown in Figs. 1 and 7, to release the skin of the fruit and to permit the positioning of succeeding fruit halves thereunder. The rear side of the trough 41 is preferably equipped with a downwardly extending lip 51 which slopes downwardly toward an endless conveyor belt 52.

As a means for driving the machine there may be provided a main shaft 53 which is connected by chains and sprockets to the shaft 12 of each unit and to the shafts on which the cranks 50 are mounted. The diameters of the sprockets are such as to cause the various parts of the machine to function in synchronism but as the reamers and belt 52 need not be operated in synchronism with the reamer of the machine, these parts may, if desired be driven by any suitable source of power.

The operation of the above described machine is as follows: The fruit of the selected size is deposited between the partitions 21 and 22 on the buckets 17 and 18. It is carried thereby against the knife 25 and split into two halves which may then fall outwardly and assume a face up position on the cups 17 and 18. When these cups pass about sprocket 14 the halves are deposited on platform 26, the follower 27 then moves forwardly carrying with it its pusher arms 30 which engage the inverted halves and slide them from platform 26 on to supporting plate 35 positioning them concentrically with relation to the apertures 40 therein. Thereafter the crank 50 causes the caps 45 to descend during which they first engage the inverted halves of the fruit and press them downwardly against the plate 35 with sufficient force so that the fruit halves are effectively clamped or held against rotation. As the caps 45 continue their downward movement they press the plate 35 downwardly against the action of the compression springs 37, thus forcing the fruit halves against their respective reamers. The pulp of the fruit is quickly reamed out by the rotating reamers and the caps 45 will thereafter be lifted allowing the supporting plate 35 to return to its normal position. Thereafter a succeeding cycle of the machine may be completed. When a succeeding pair of fruit halves are being pushed forwardly by the pusher arms 30 to position new fruit halves over the apertures 40 in plate 35, the positioning of these new fruit halves serves to displace the skins of the reamed halves by pushing them rearwardly so that they may slide down the inclined lip 51 and be deposited on the conveyor belt 52 which conducts them to a suitable place of disposal. The trough 41 preferably has an inclined bottom so that the extracted juice flows to a suitable outlet where it may be caught in suitable containers.

It will be appreciated that a number of these units may be assembled in side by side relationship and that the number required will vary in accordance with varying conditions. If the fruit is fairly uniform as to size only a few units may be required to handle all of the sizes that are separated from each other by the grader or sizer. On the other hand if the size of the fruit is highly irregular a large number of units may have to be assembled in order to handle all of the various sizes.

It will be appreciated that the improved machine is fully automatic in that it is merely necessary to feed the fruit to the grader or sizer after which the fruit is split or divided into halves or portions which in turn are mechanically applied to the reamer to have the juice extracted therefrom. When the juice is extracted the juice is collected in the trough 41 and the reamed skins are deposited upon the conveyor 52. Although all units may be driven off of the single main drive shaft 53, it will be appreciated that if desired each unit may be separately driven.

Various changes may be made in the details of construction without departing from the spirit or scope of the invention as defined by the appended claims.

I claim:

1. In a citrus juice extractor, endless conveyor means having pairs of opposed cups thereon on the adjacent portions of which a fruit is adapted to be positioned, cutting means arranged to split the fruit, guide means on opposite sides of the cutting means for maintaining the fruit on the adjacent portions of the opposed cups, said guide means terminating behind the cutting means to enable the halves of the fruit to fall cut face uppermost on the opposed cup after having been cut by the cutting means, pairs of power driven reamers arranged in approximate alinement with the cups on the conveyor means, an apertured vertically movable plate over the reamers, a platform adjacent said plate on which the halves of the fruit are positioned cut face down, means for periodically advancing the halves of the fruit from the platform onto the vertically movable plate over the apertures therein, and means for engaging the tops of the fruit halves and forcing them and the plate downwardly so that the fruit may be reamed by the reaming means.

2. A citrus juice extractor comprising endless conveyor means having opposed pairs of cups, means for feeding whole citrus fruit to positions between the cups, means for splitting the fruit so that its halves may fall outwardly to assume positions with their cut faces uppermost on the cups, reamers arranged in alinement with the opposed cups on the conveyor means, a descendable supporting means arranged thereover, said endless conveyor means being arranged to dump the cut halves so that their cut faces will be disposed downwardly, means for centering the halves of the cut fruit with their cut faces lowermost on the descendable support over the reamers, and means for forcing the halves of the cut fruit together with the descendable support downwardly so that the halves may be reamed by the reaming means.

3. A citrus juice extractor comprising endless conveyor means having opposed pairs of cups, means for feeding whole citrus fruit to positions between the cups, means for splitting the fruit so that its halves may fall outwardly to assume positions with their cut faces uppermost on the cups, reamers arranged in alinement with the opposed cups on the conveyor means, a descendable supporting means arranged thereover, said endless conveyor means being arranged to dump the cut halves so that their cut faces will be disposed downwardly, means for centering the halves of the cut fruit with their cut faces lowermost on the descendable support over the reamers, and means for forcing the halves of the cut fruit together with the descendable support downwardly so that the halves may be reamed by the reaming means, and means for elevating the descendable support so as to elevate the skins from the reaming means.

4. A citrus fruit juice extractor comprising a horizontal platform, a plate normally assuming a position horizontally flush with said platform having apertures therein, a power driven reamer under each aperture, means allowing the plate to descend toward the reamers but urging the plate to return to its normal flush position, means for depositing halves of citrus fruit on the platform, one for each aperture, a notched bar, the notches of which are engageable with the halves for advancing the halves from the platform onto the plate and centering them with relation to their respective apertures therein, means for forcing the centered halves and plate toward the reamers to ream the halves and then allow the plate to return to normal position, and means for reciprocating the notched bar in timed relationship to the last-mentioned means so that when the halves and plate are forced downwardly against the reamers the notched bar will be in retracted position.

5. A citrus fruit juice extractor comprising a stationary horizontal platform, a plate normally assuming a position horizontally flush with said platform and having apertures therein, a power-driven reamer under each aperture, means allowing the plate to descend toward the reamers but urging the plate to return to its normal flush position, means for depositing halves of citrus fruit in cut-side down position on the platform, one for each aperture, and a notched bar mounted for horizontal reciprocation over the platform and plate from a position adjacent said apertures to a position beyond said depositing means, said notches being V-notches in a lateral edge of said bar and aligned with the centers of said apertures, the notches of which are thereby engageable with the deposited halves for pushing the halves horizontally from the platform onto the plate and centering them with relation to their respective apertures therein, and means for forcing the centered halves and plate toward the reamers to ream the halves and then allow the plate to return to normal position.

HARRY L. WURGAFT.

REFERENCES CITED

The following references are of record in the file of this patent:

UNITED STATES PATENTS

| Number | Name | Date |
|---|---|---|
| 2,017,960 | Faulds | Oct. 22, 1935 |
| 2,114,217 | Edenfield | Apr. 12, 1938 |
| 2,114,218 | Edenfield | Apr. 12, 1938 |
| 2,163,791 | Lang | June 27, 1939 |
| 2,199,876 | Brown | May 7, 1940 |
| 2,270,007 | McKinnis | Jan. 13, 1942 |
| 2,311,565 | Nelson | Feb. 16, 1943 |